(No Model.) 12 Sheets—Sheet 1.

C. TELLIER.
APPARATUS FOR PRODUCING MOTIVE POWER.

No. 431,677. Patented July 8, 1890.

Fig. 1

(No Model.) 12 Sheets—Sheet 2.

C. TELLIER.
APPARATUS FOR PRODUCING MOTIVE POWER.

No. 431,677. Patented July 8, 1890.

Fig. 2

Witnesses
Inventor
Charles Tellier
by John J. Halsted & Son
his Attys.

(No Model.)

C. TELLIER.
APPARATUS FOR PRODUCING MOTIVE POWER.

No. 431,677.  Patented July 8, 1890.

Fig. 2 bis (No Model.) 12 Sheets—Sheet 4.

C. TELLIER.
APPARATUS FOR PRODUCING MOTIVE POWER.

No. 431,677. Patented July 8, 1890.

Fig. 3.

Witnesses
Will T. Norton
Alvin Bell

Inventor
Charles Tellier
by John J. Halsted
his Attys.

(No Model.) 12 Sheets—Sheet 5.
C. TELLIER.
APPARATUS FOR PRODUCING MOTIVE POWER.

No. 431,677. Patented July 8, 1890.

(No Model.) 12 Sheets—Sheet 6.

C. TELLIER.
APPARATUS FOR PRODUCING MOTIVE POWER.

No. 431,677. Patented July 8, 1890.

Fig. 5.

Witnesses
Will T Norton
Alvin Bett

Inventor
Charles Tellier
by John J. Halstead & Son
his Attys.

(No Model.) 12 Sheets—Sheet 7.

C. TELLIER.
APPARATUS FOR PRODUCING MOTIVE POWER.

No. 431,677. Patented July 8, 1890.

Witnesses
Will I. Norton
Elwin Belt

Inventor
Charles Tellier
by John J. Halsted Son
his Attys.

(No Model.) 12 Sheets—Sheet 8.

C. TELLIER.
APPARATUS FOR PRODUCING MOTIVE POWER.

No. 431,677. Patented July 8, 1890.

(No Model.) 12 Sheets—Sheet 11.
C. TELLIER.
APPARATUS FOR PRODUCING MOTIVE POWER.

No. 431,677. Patented July 8, 1890.

(No Model.) 12 Sheets—Sheet 12.

C. TELLIER.
APPARATUS FOR PRODUCING MOTIVE POWER.

No. 431,677. Patented July 8, 1890.

Fig. 11.

UNITED STATES PATENT OFFICE.

CHARLES TELLIER, OF PARIS, FRANCE.

APPARATUS FOR PRODUCING MOTIVE POWER.

SPECIFICATION forming part of Letters Patent No. 431,677, dated July 8, 1890.

Application filed June 5, 1889. Serial No. 313,223. (No model.)

*To all whom it may concern:*

Be it known that I, CHARLES TELLIER, a citizen of the Republic of France, residing at Paris, France, have invented new and useful Improvements in Apparatus for Producing Motive Power, of which the following is a specification.

This invention relates to improvements in and in apparatus for the production of motive power in an economical manner by the simultaneous employment of combustible gases, water steam, and ammoniacal vapor.

In order to render the following description more clear, I will briefly indicate the three groups of parts employed for each of the above-described fluids, the concordance of which will be shown by the description.

The first group comprises an apparatus in which the combustible is transformed into gas, a reheater, suction and force pumps, and a cylinder underneath the piston of which the gases are burned during one-half of its double stroke.

The second group comprises the apparatus in which the combustion of the coal or other combustible is effected, the escaping heat of which, acting on a boiler which surrounds it, produces water steam, the motor-cylinder utilizing the elastic force of that steam during the second half of the double stroke of the piston and the apparatus in connection for effecting the exchange of temperature.

The third group comprises the apparatus in which the combustion of the coal is effected, the heat of which superheats gaseous ammonia extracted under pressure from an ammoniacal solution, a cylinder under the piston of which the pressure of the gas acts, apparatuses in which the change of temperature is effected, and those in which the reconstruction of the ammoniacal solution is effected.

In the accompanying drawings.

Figure 1:
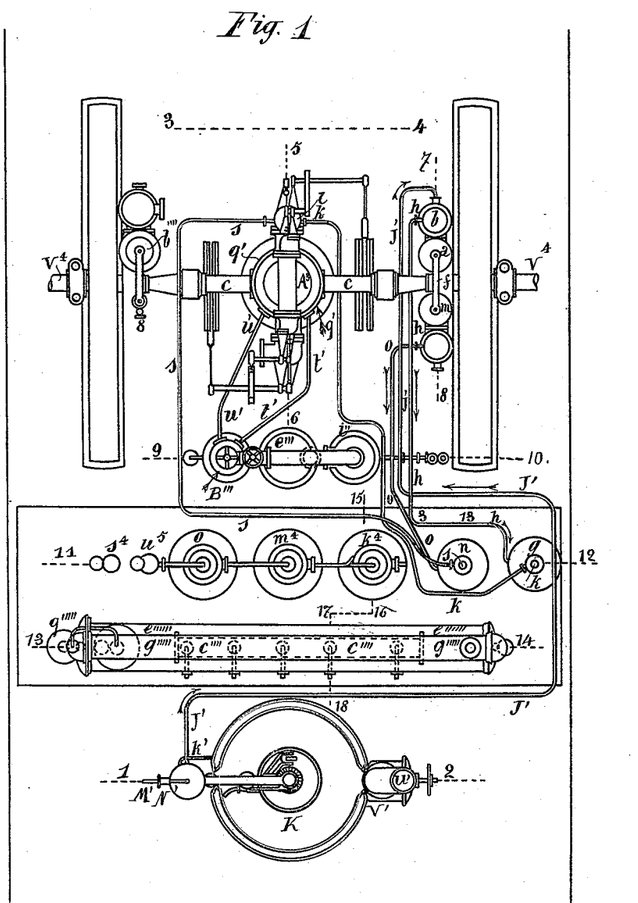
Figure 1 is a general plan of the apparatus, showing the direct and inseparable relation of the different parts employed.

Having illustrated in Fig. 1 the connection which exists between the different parts of the apparatus, whereby a complete arrangement is provided conducing to the object aimed at—that is to say, to the economical production of motive power—I will now describe the different parts of which the apparatus is composed.

Figure 2:
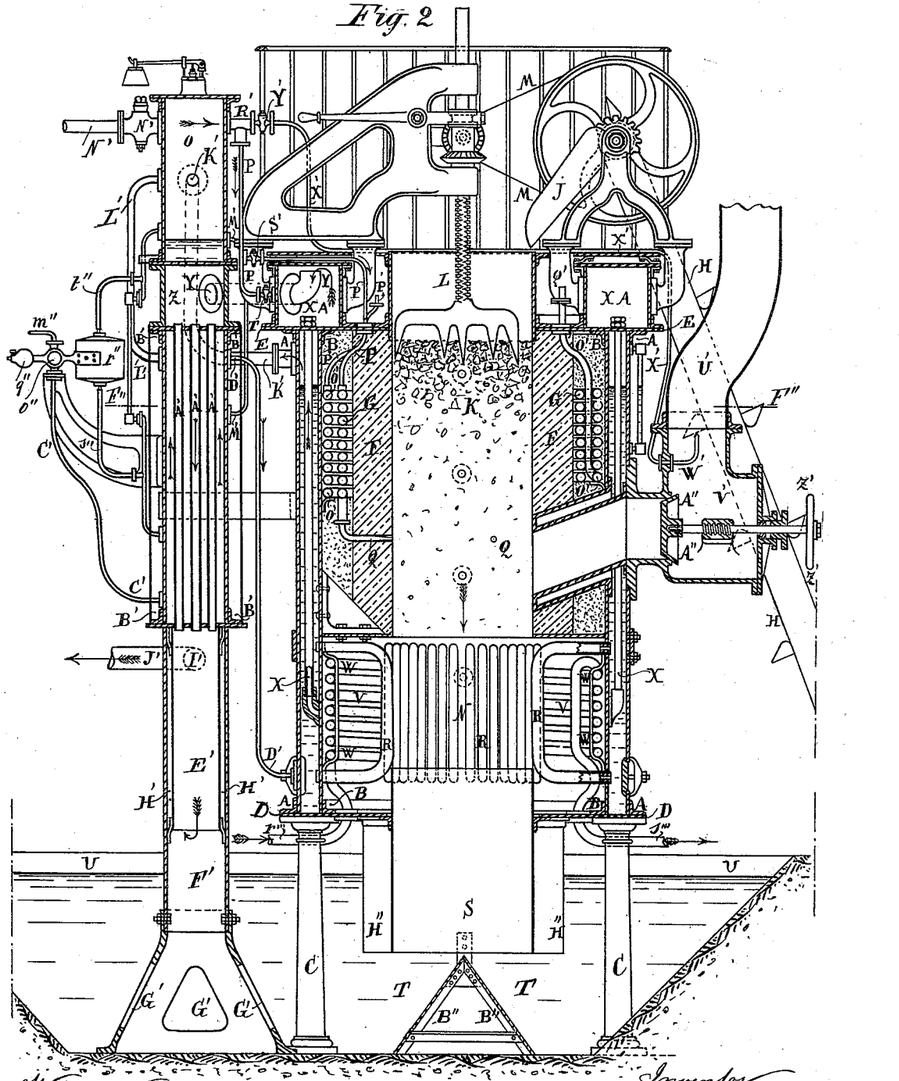
Fig. 2 is a vertical section of the gas-producer, the section being taken on the line 1 2 of Fig. 1. Fig. $2^{bis}$ shows the bucket-chain.

Fig. 2 is a vertical section of the part of the apparatus in which the decomposition of the fuel and the vaporization and superheating of the vapors are produced. It consists, principally, of a double annular jacket A A A A B B B B, supported by several columns, two of which are shown at C C. This double jacket is closed at the top and bottom by plates D D E E, so as to form an annular boiler, the resistance of which will be sufficient to withstand a pressure of several atmospheres. In the central space of the said annular boiler A B, A B, B A, B A is a chamber or retort of refractory clay, the sides of which are shown in section at F F. In the annular space left between the retort F F and the boiler A B, A B, B A, B A are two tubular coils G G and O' O' O' O', the use of which will be hereinafter described. The whole of the annular space left between the retort F F and the annular boiler is filled with powdered chalk or other pulverulent substance. A double result is thus obtained. The first is the perfect isolation of the heating apparatus, and the second the stopping up of the orifices, which are produced under the action of the fire in the retort F F, and consequently the stoppage of the passages of air which would otherwise be produced and transform a portion of the oxide of carbon gases already obtained into carbonic acid.

Figure 3:
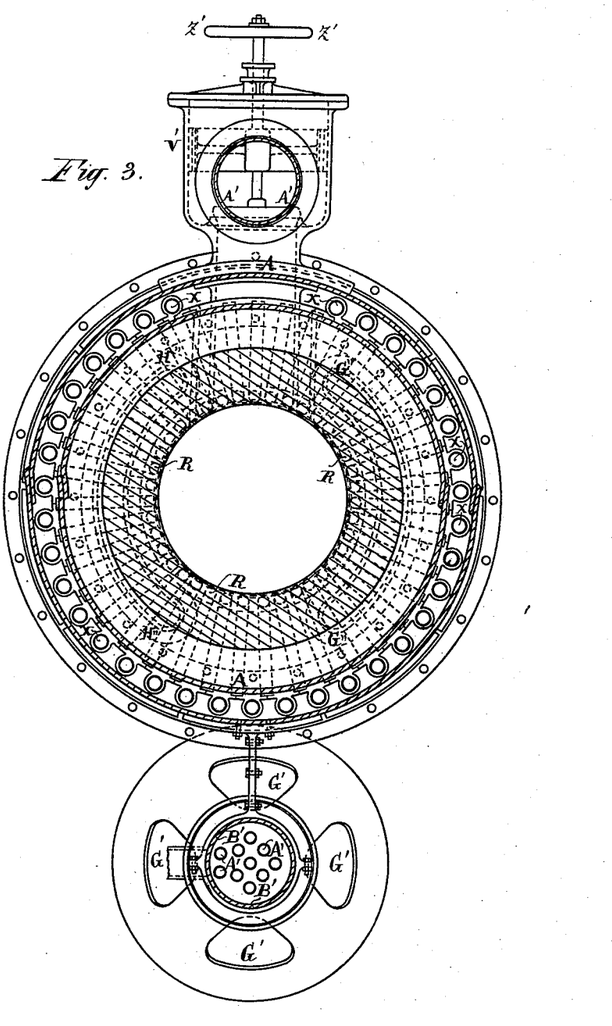
Fig. 3 is a section of the gas-producer on the line F" F" of Fig. 2.

At the side of the apparatus is a bucket-chain H H, which continually raises the fuel from a pit I and discharges it at the upper part of the apparatus into a hopper J. Only the upper part of this chain is shown in Fig. 2, the lower part thereof, as well as the pit I, in which it enters, being shown in Fig. $2^{bis}$. The fuel is thus fed into the retort K in a continuous manner; but, as in consequence of this constant supply the fuel would become heaped up in a conical form in the interior of the retort K, I provide a rake L or regulator having a continuous circular and plunging movement, which spreads and regulates the fuel as fast as it is fed into the apparatus. This regulator is formed by a screw with a double or right and left hand thread operated by the apparatus itself through the medium of a chain M M. It will be easily understood that by reason of this continuous rotary and plunging action the coal becomes sufficiently spread over the whole surface of the retort K, and at the same time sufficiently heaped up to prevent the formation of passages or fissures in the fuel while working. The retort is besides larger at the top than at the bottom, so as to force the fuel to unite as fast as it descends. Under the influence of the current of gas, which takes place constantly through the pump $a$, Fig. 5, as hereinafter described, air replacing the gas extracted enters constantly through the upper part of the retort K, which contains free air and supports the combustion. In this combustion the flames are turned backward, and consequently the current of burnt air descends and traverses a whole length of the retort K, passing through the mass of fuel contained in the retort. This fuel arrives red-hot, and the carbonic acid at first produced is consequently decomposed, and a mixture of nitrogen and combustible gases combined with the cinders or ashes is received in the lower part N. The decomposing action of the fuel is assisted by a current of vapors, which, coming from the vapor-chamber O, enters the coil G G through the passage P P P P, becomes superheated therein, and enters the retort K through several injectors. One of these injectors is shown in section at Q. The delivery-opening of another injector Q is shown in the same retort K. The gases thus produced and descending with the cinders into the lower part N still have a very high temperature. In order to withdraw from them the heat thus carried away, as well as that of the cinders, the space N is fitted with a sufficient number of water-circulating tubes R R. The straight tube is partially in section and shows how these tubes are flanged or riveted onto the boiler A B, A B, B A, B A, and consequently they are always filled with a current of water. The circulation thus produced draws back into the said boiler the steam which is formed by the passage of the water through the tubes R R and prevents the latter from burning. The great number of these tubes R R presents a considerable amount of surface, which always allows of readily absorbing the caloric brought into contact therewith. Fig. 3 shows at R R R R the general arrangement of these tubes. It will be readily seen that they form a kind of grating, across which pass the escaping gases, while the cinders sliding along the said tubes pass through the tubular extension S, Fig. 2, and fall to the bottom of the pit T T, filled with water to the level U U. The gas having passed across the tubular grating R R enters the annular space V V, in which is a superheater W W W W for ammoniacal gas. The gases produced enter a series of tubes X X, surrounded by the water in the boiler A B, A B, B A, B A, and are thus conducted into the annular chamber X A X A, and thence by means of a short tube Y Y they are conducted into another chamber Z. Here they still possess a certain quantity of heat, as the water in the boiler A B, A B, B A, B A is boiling at a pressure of several atmosphères. In order to abstract the quantity of heat thus retained by the gases, I cause them to descend through a series of tubes, three of which are shown at A' A' A'. These tubes are inclosed within a reheater B' B' B' B', serving to heat the feed-water, which enters through the tube C' C', rises to the top of the reheater, and absorbs all the caloric from the tubes A' A' A', and finally the water passes off through the tube D' D' and is fed into the boiler A B, A B, B A, B A. In this manner the caloric of the gases which are passing to the motor is abstracted in a methodical and continuous way, the gases by the time they pass into the casing E' having become cool. This casing has for its object to cause the dust drawn along by the gases to be precipitated into the water contained in the open cylinder F', and consequently to accumulate in the base G' G' G', from which they can be extracted through the openings therein, while the gases rise through the annular space H' H' between the casing E' (which can be perforated throughout its length) and the side of the cylinder F'. The said space leads to the outlet-orifice I', to which is attached a tube J', passing to the compression pump $a$, Fig. 5. Thus atmospheric air enters through the upper part of the retort K and passes through the same from top to bottom. All the coal becomes decomposed, and the products of this decomposition pass through the tubular grating R R and through the tubes X X and accumulate in the annular box X A X A. Thence through the tube Y Y the gases reach the chamber Z, pass through the tubes A' A' A' into the casing E', escape through the annular space H' H', and through the orifice I' and the tube J' to the pump $a$, Fig. 5. The production of the steam therefore takes place in the annular boiler A B, A B, B A, B A and the reheater B' B' B' B'. The steam produced in the annular boiler escapes through the tube K' K', terminating in the drainer O. The steam formed in the reheater B' B' B' B' passes off through the tube L' L', which also terminates in the drainer O. The water drawn along by the steam drips into the drainer O, and through the medium of the return-pipe M' M' M' again enters the reheater B' B' B' B'. The steam which accumulates in the drainer O escapes through a cock and tube N', (shown also in Fig. 8,) fitted in a drainer $e''' e'''$ and extending into the interior thereof, $i'''$ representing the extension. The water steam is thus brought into the said drainer and is then passed into a superheater A''', Fig. 8, to be utilized by the motor-cylinder. The steam thus produced could be caused before its leaving the gas-producer to pass into a coil O' O' O' O', Fig. 2, arranged around the retort K. The result of this operation would be to dry the steam, and consequently to bring it into the superheater A''', Fig. 8, in a vesicular state and free from water. In this case the tube N' would be joined to the orifice P' of the coil O' O' O' O', and the tube leading to the motor would be joined at Q' to the said coil. The tube which would be employed in this case is not indicated on the drawings. The steam under these conditions being sufficiently dry, it would be useless to cause it to pass through the drainer $e''' e'''$, Fig. 8, it being more simple to conduct it directly to the superheater A''' through a tube $j'''$ at the lower end of the tube $f''' f'''$, Fig. 8.

Another tube R', placed on the drainer O, allows of the steam being used for three different purposes:

First. The tube P P P P conducts the steam into the superheating-coil G G. This steam is intended to be decomposed, and the cock S' allows of regulating its flow.

The second use to which the steam is put is only occasional—namely, to effect the cleaning of the tubes X X. For this purpose a cock T, placed on the pipe P, allows of regulating the entry of the steam into the vapor-chamber X A X A, and then into the tubes X X. By this means the steam is driven through the tubes and thereby cleans them, the apparatus consequently always remaining in good working order.

Figure 5:
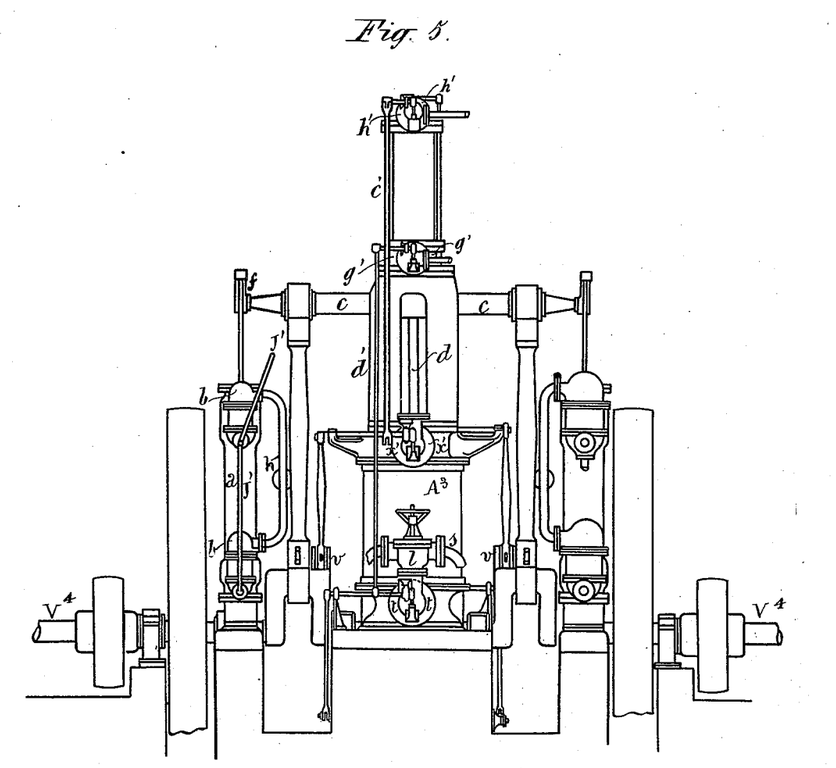
Fig. 5 is an exterior view of the motor, taken from the position indicated by line 3 4 of Fig. 1.

The third use for the steam consists in injecting it into the flue U'. As a matter of fact, when the apparatus is working the action of the pump $a$, Fig. 5, is sufficient to maintain the combustion; but during the night a natural draft is necessary to keep the gas-producer alight, so that it may be in working order in the morning. For this purpose a valve V', surmounted by a flue U', is placed on one of the sides of the apparatus. In this flue is an injector W', which is connected to the cock Y' through the medium of the tube X' X' X'.

In order to make use of the flue, it is only necessary to open the cock Y', which supplies the injector W', then by means of the hand-wheel Z' Z' to unscrew the stopper A'' A'' of the valve V', when a draft will immediately be established through the flue U' at the proper moment for setting the motor in operation.

The cinders or slag mixed with coke fall onto the double-inclined plane B'' B'', which is immersed in the water contained in the pit T T, and is removed therefrom by a hand-dredger or by a dredger actuated by the motor. When the slag and coke have been brought onto the surface of the ground, they are separated and the coke is made use of in the apparatus, while the scoria is thrown away. The water is not absolutely indispensable, as the scoria can be removed intermittently and without requiring any hydraulic closing.

Figure 4:
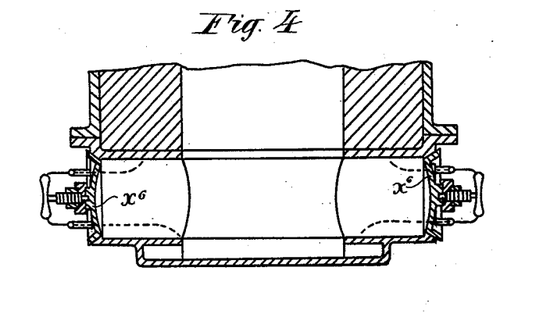
Fig. 4 is a section of the lower part of a gas-producer worked without a water-pit.

Fig. 4 illustrates the lower part of a gas-producer worked under these conditions. By opening the covers $x^6 x^6$ from time to time a quantity of coke mixed with scoria can be withdrawn, which allows of the apparatus working for five or six hours without it being necessary to make a fresh withdrawal.

Fig. 3 is a horizontal section of the gas-producer on the line F'' F''. It shows clearly, first, the tubes X X, placed in the annular boiler A B, A B, B A, B A; second, the annular grating formed by the tubes R R R R, through which a current of water passes; third, the tubular extensions G'' G'' H'' H'', allowing the scoria or cinders which have passed over the grating R R R R to fall into the water in the pit T T; fourth, the reheater B' B', with its interior tubes A' A', &c.; fifth, the openings G' G' G' G', through which the removal of the cinders brought along by the gases is effected; sixth, the valve V', with its accessories.

By referring to the plan, Fig. 1, the gas-producer K will be seen as well as the tube J', through which the combustible gases produced are conveyed away. I have shown that these gases enter the pump $a$ through the valve $b$, Figs. 5 and 7, and Fig. 1 shows clearly the tube J' extended to the valve $b$ of the pump $a$.

Figure 6:
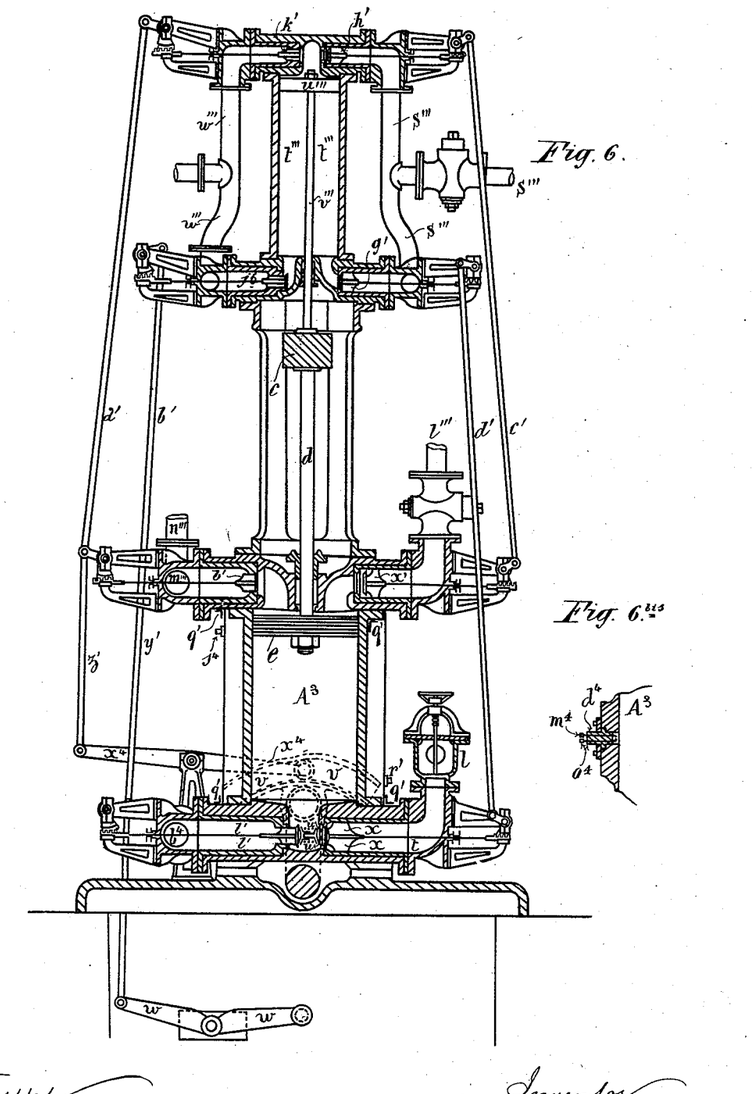
Fig. 6 is a sectional elevation of the motor-cylinders, the section being taken on the line 5 6 of Fig. 1. Fig. $6^{bis}$ is a section showing a lighting-hole and stopper.
Figure 7:
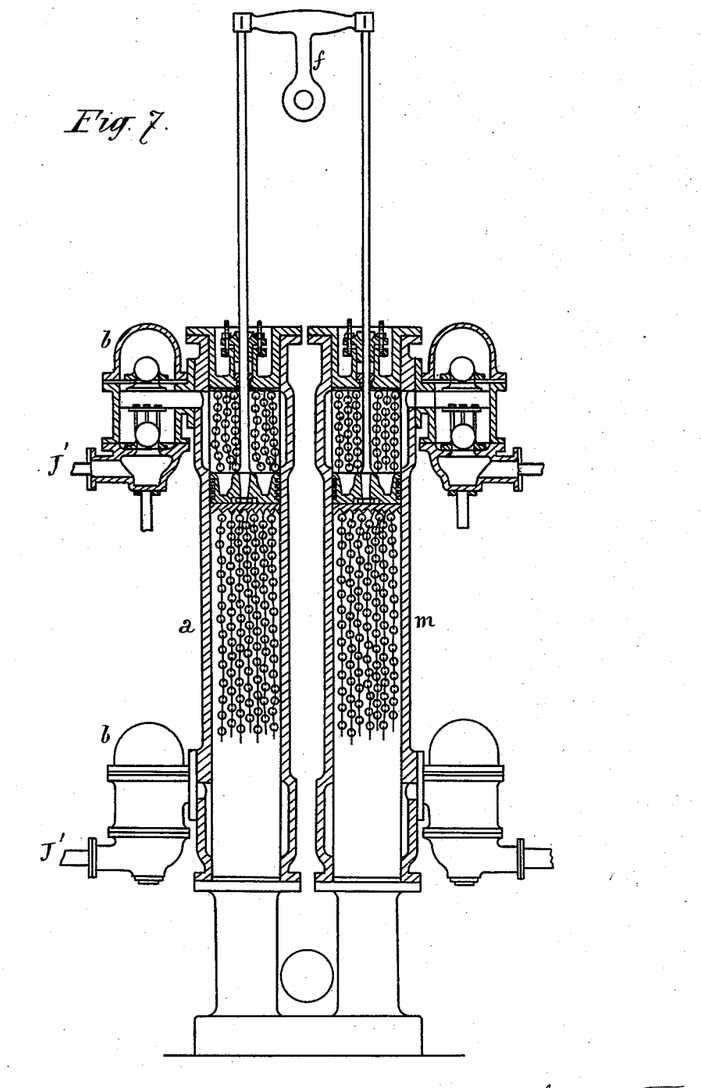
Fig. 7 is a sectional elevation of the compression-pumps, the section being taken on the line 7 8 of Fig. 1.

Fig. 7 shows the pump $a$ in section, with its suction and exit valves $b b$. It is operated by the motor S. (Shown in Fig. 5.) The motor-piston is shown at $e$ in Fig. 6, together with its rod $d$, keyed to the cross-piece $c$.

Figure 9:
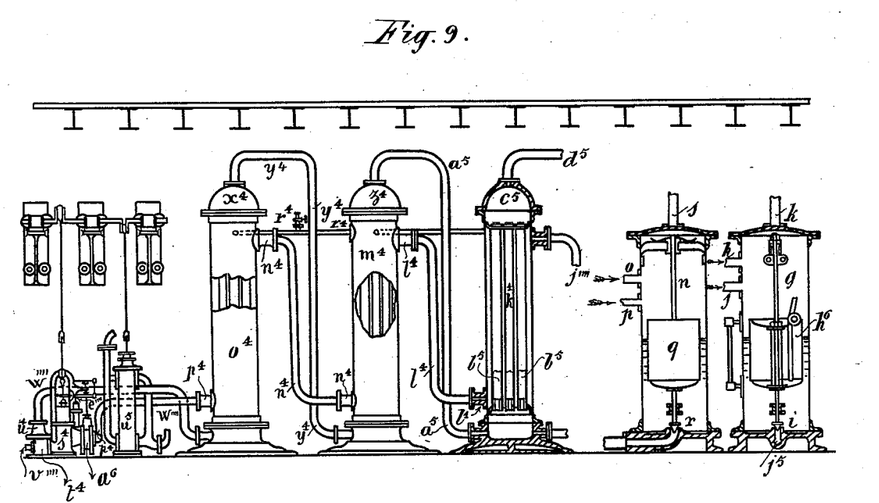
Fig. 9 is a view, partly in section, of the water-floats and the ammoniacal reheaters, the section being taken on the line 11 12 of Fig. 1.
Figure 10:
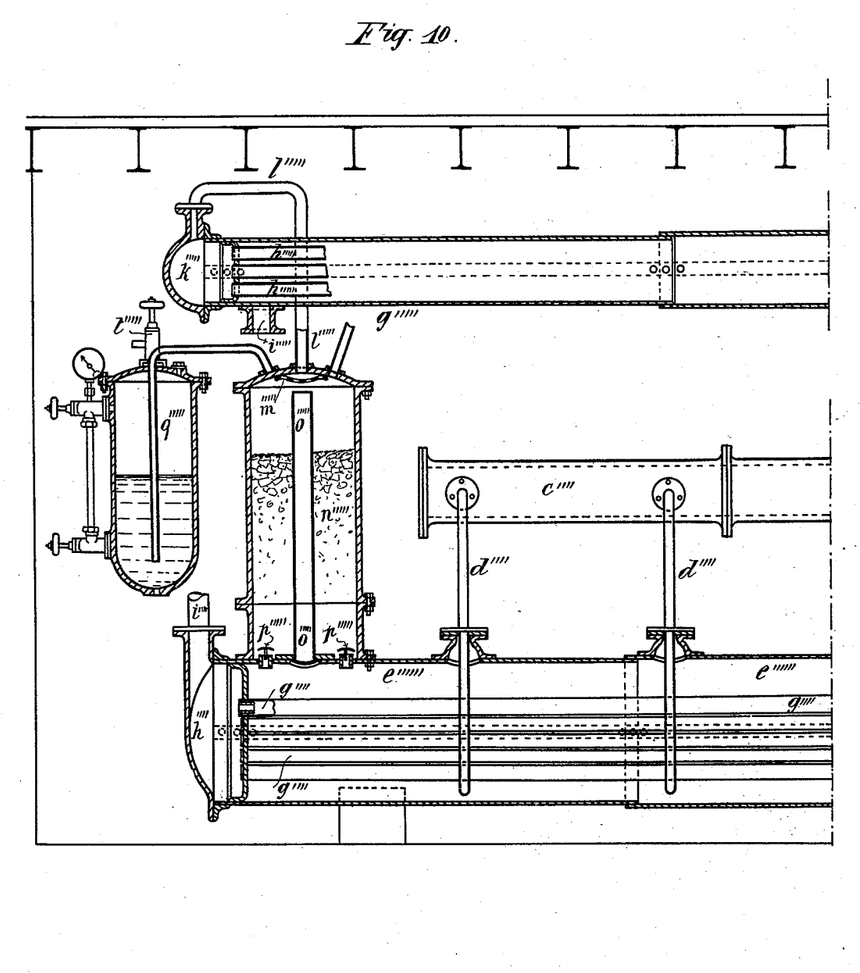
Figs. 10 and $10^{bis}$ are a view, partly in section, on the line 13 14 of Fig. 1, of the ammonia-absorber, (half of this apparatus being shown in Fig. 10 and the other half in Fig. $10^{bis}$.)

By reference to Figs. 1, 5, and 7 it will be seen at $f$ how the pump is advantageously actuated by the motor through the medium of the cross-piece $c c$. The gases drawn in by the pump $a$ are forced with the water through the tube $h h h$ into a vessel $g$, Fig. 1. (Shown also in vertical section in Fig. 9.) The gases are conducted into this vessel through the tube $h$, as shown in Fig. 9. The water which passes into the pumps provided with calorific chains, according to a former patent, numbered 275,437, and dated April 10, 1883, reaches the vessel $g$ through the tube $j$. The vessel $g$ is provided with a float $h^6$, which serves to raise the stopper $i$, so as to allow the water to escape through the tube $j^5$. The gases accumulate in the upper part of the vessel $g$ and leave the same through the tube $k$, Figs. 9 and 1.

As shown in Fig. 1, the tube $k$ $k$ $k$ extends to the inlet-valve $l$ of the motor-cylinder $A^3$, Figs. 1 and 5. Besides introducing combustible gases into the motor-cylinder $A^3$, it is also necessary to furnish air in order to produce the ignition. For this purpose I employ a pump $m$, Figs. 1, 7, and 8, which is similar to the pump $a$, and is likewise actuated by the cross-piece $c c$. It is situated when looking at Fig. 5—that is to say, when the observer occupies the line 3 4—immediately behind the pump $a$.

Figure 8:
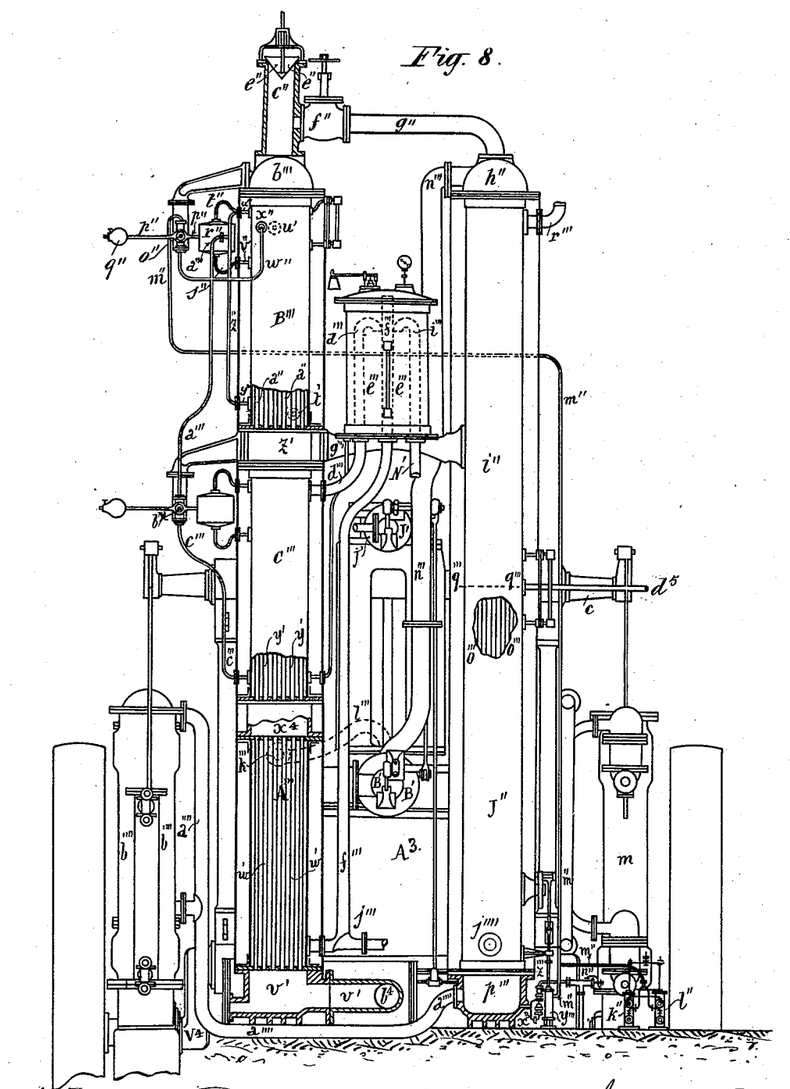
Fig. 8 is a sectional view of the reheaters, the section being taken on the line 9 10 of Fig. 1.
Figure 11:
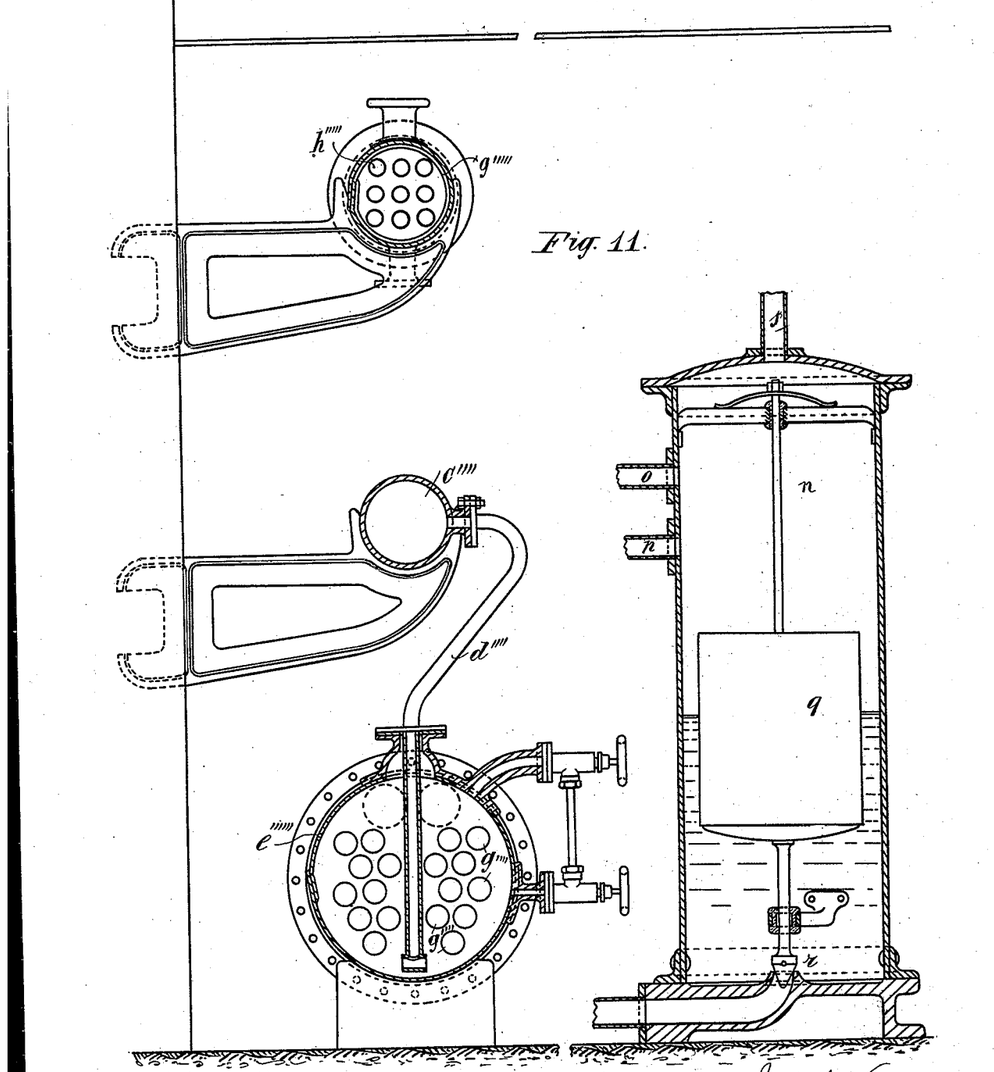
Fig. 11 is a section on the line 15 16 17 18 of Fig. 1.

Fig. 8, which supposes the observer to be situated behind the apparatus—that is to say, on the line 1 2, Fig. 1—shows the rear side of a motor partly in section. For this reason the pump $m$, Fig. 8, appears to be opposite the side represented by Fig. 5; but by reference to the plan view, Fig. 1, the opposite position of the two sides will be clearly seen, and it will also be seen that the two pumps $a$ $m$ are placed one behind the other, as distinctly shown in Fig. 7. The air drawn in by the pump $m$ is compressed and forced out into the float-chamber $n$, Figs. 1, 9, and 11. The said air is conducted, as shown in Fig. 1, into the chamber $n$ by means of the tube $o o o$. (Shown also in Figs. 9 and 11.) The water employed in the pump $m$ enters the same chamber through the tube $p$, Figs. 9 and 11. The float $q$, by raising the stopper $r$, allows the water to run off, while the air accumulating under pressure in the upper part $n$ escapes through the tube $s$, (shown also in Fig. 1,) which tube is extended at $s s s$ to the inlet-valve $l$ of the motor-cylinder $A^3$. (Shown also in Fig. 5.) This valve is in front of the inlet-valve $t t$, Fig. 5.

Fig. 6 shows the inlet-valves $l$ and $t t$ in section. The valve is double-acting—that is to say, it prevents the introduction of the gas by means of the part $x x$; but by means of the spring portion $u u$ it also prevents the exit of the gases during their ignition under the piston. The inlet-valve $x x$ and the outlet-valve $l' l'$ are actuated by cams $v v$, Figs. 5 and 6, mounted on the motor-shaft $V^4 V^4$. This shaft in rotating causes the cam $v v$ to actuate the lever $x^4 x^4$, and also the lever $w w$. To these levers are attached connecting-rods $y' z' a' b' c' d'$, which successively cause the inlet-valves $x x x' x' g' g' h' h'$ and the outlet-valves $l' l' b' b' j^6 j^6 k' k'$ to operate. Any suitably-constructed valve may be employed in place of those shown. When the gaseous mixtures have been introduced and the inlet-valve $x x$, Fig. 6, has been closed, the mixture must be ignited. This is effected by means of a number of stoppers placed in suitable parts of the cylinder, and one of which is shown in Fig. $6^{bis}$ at $d^4$. These stoppers are made of porcelain and carry two wires $m^4$ and $o^4$, connected to a coil or other suitable electric agent. They allow of the spark which ignites the mixture being produced in the cylinder. By this means the union of the gases takes place and the movement is given to the motor. In order to assist the operation of the gases after their combustion, I can form a chamber at the end of the corresponding stroke of the piston by extending the motor-cylinder for a few centimeters. In this case the introduction would take place before the end of the return-stroke of the piston, so that the ignition would be effected at the dead-point. The gases as they leave the cylinder possess a high degree of temperature by reason of the resistance of the carbonic oxide to combustion. This heat manifests itself in two parts—first, at the periphery of the motor-cylinder, and, secondly, in the gases which have performed their work.

The motor-cylinder $A^3$ is surrounded by a sheet-iron casing $q' q' q' q'$, which can be cast with the cylinder; but in any case it must be of sufficient resistance to withstand the pressure of several atmospheres, as it is connected by a tube $s^4$ with the vaporizing portion of the whole apparatus.

Fig. 1 shows at $t' t' u' u'$ the tubes which connect the casing $q' q'$ to the reheater $B''' C''' A'''$, Fig. 8, the said tubes where they join the point $B'''$ being indicated at $t' u'$. The escaping gases which pass out through the valve $l' l'$, Fig. 6, leave through the tube $b^4$. (Shown also at $v' v'$, Fig. 8.) They pass through tubes $w' w' w'$ to an intermediate chamber $x^4$. This chamber serves to assist a certain eddying of the gases before they enter the tubes $y' y' y'$. From the parts $C'''$ they pass into a chamber $z'$, similar to the chamber $x^4$, which allows them to enter the tubes $a'' a''$ of the part $B'''$. Thence the gases pass into the dome $b''' b'''$, which causes them to enter the flue $c'' c''$. The upper end of this flue is provided with a valve $e''$, opening outward, which allows of the final expulsion of the gases which have done their work. The valve $e''$ has for its object to allow of profiting by the relative vacuum produced by the absorption of the caloric in the used gases. A valve $f''$, Fig. 8, allows of increasing the action of the vacuum by placing the flue $c'' c''$ in connection by means of the tube $g''$ either with the reheater $h'' i'' j''$ or with an ordinary pneumatic pump.

The reheater $B''', C''',$ and $A'''$ serves to extract from the gases the caloric which they contain. This caloric can be extracted by a current of compressed air, which would be utilized in the motor-cylinder $A^3$, Fig. 6, by introducing it through the inlet-valve $x' x'$; but I prefer to employ water, the action of which is more energetic, and in order to utilize the said water in as complete a manner as possible I divide the reheater $B''' C''' A'''$ into three principal parts. The part B‴, which is the coolest, serves as a reheater. The part C‴ serves as a boiler. The part A‴ serves as a superheater.

By means of the pumps K″ and l″, Fig. 8, connected to the pipe m‴ m″ m‴, the feed-water is drawn up, and it is sent either into the gas-producer in Fig. 2, which also shows the tube m″, or into the reheater B‴, C‴, and A‴ through the said tube m″ m″ m‴. A valve-cock n″, Fig. 8, or other valve allows of regulating the pressure of the water in accordance with that which exists in the apparatus. At the end of the tube m″ is a cock o″, on the plug of which is a double lever p″ p″. One end of the lever carries a counter-weight q″ and the other a water-tight vessel r″, connected by two india-rubber tubes s″ t″ with tubes u″ and v″, fitted on the reheater B‴. It is clear that owing to these two tubes the water in the receiver r″ will be always level with the water contained in the reheater B‴. Now when the reheater B‴ is full the vessel r″ will also be full, and consequently heavier than the counter-weight, (the tubes s″ t″ being of india-rubber,) and the cock o″ will be closed. When, on the contrary, the reheater B‴ becomes empty, the vessel r″ will be also empty, and consequently lighter than the counter-weight q″, and will resume its former position, whereby the plug of the cock will be turned in the opposite direction, and the cock o″ will be opened and will re-establish the feed. A similar feed apparatus is employed, as shown in Fig. 2, for feeding the gas-producer, like letters being used to indicate like parts. This being understood, the circulation of the water and the vapor is easily explained. Below the cock o″ is a tube w″, which conducts the cold water to x″—that is to say, into the upper part of B‴—where the gases passing through B‴ in the tubes a″ a″ a″ are the coolest. The water thus introduced gradually descends in B‴, at the lower part of which is a short tube y″, to which is connected a tube z″, leading to an upper short tube u″, and from which extends a tube a‴, leading down to a second feed-cock $b^x$, which, through the medium of a tube c‴, communicates with the lower part of the boiler C‴. In this manner the water leaves the reheater B‴ through an overflow formed by the tube z″, and the reheater B‴ is always full of water, and its surfaces are utilized to the fullest possible extent. The chamber C‴ is filled with water up to the level of the vapor-tube d‴ d‴, and consequently the whole surface of the tubes y′ y′ are employed in as complete a manner as possible, and in fact it is a mixture of water and vapor which leaves through the tube d‴ d‴. In order to separate these two bodies, I lead the tube d‴ d‴ into the chamber e‴ e‴. The vapor leaves through the tube f‴ f‴ and passes to the superheater A‴, while the water is brought back through the tube g‴ g‴ into the lower part of the boiler C‴. Another tube i‴ i‴ N′ (shown on the separator e‴ e‴) is in direct communication, as already indicated, with the vapor-tube N′, leading from the gas-producer, Figs. 1 and 2. The vapor brought by the tube f‴ f‴ j‴ into the superheater A‴ entirely fills it. It then receives the intense calorific action produced by the passage of the burned gases through the tubes w′ w′. The vapor thus superheated passes off through the opening K‴, which, by means of a tube l‴, (shown also in Fig. 6,) is in communication with a valve x′ x′.

It will be seen by reference to Fig. 6 that the piston e, working in the cylinder $A^3$, has two different actions. When the piston e is acted upon from beneath, the mixture of combustible gases is the operating medium. When, on the other hand, it is operated from above, the superheated vapor produces the motive action. In this cylinder $A^3$ are thus utilized two of the actions which I desire to combine, so as to twice utilize the heat—videlicet, first, the combustion of the gases; second, the pressure of the water steam produced by the various exchanges of heat above referred to.

It is possible that a carbonaceous deposit might be produced in the motor-cylinder at the side at which the combustible gases enter, which deposit, accumulating in layers, would be liable to smoulder, and thereby prematurely cause the combustion of the gases before the closing of the inlet. To prevent this it is only necessary to arrange the machine so that one side of the piston shall be acted upon alternately by gas and vapor, and the passage of the latter will remove the layer of carbonaceous deposit, leaving the apparatus perfectly clean.

I will now explain how the third action—namely, that of the ammonia—takes place. As shown in Fig. 6, the water steam passes off through the outlet-valve b′ b′, from which extends a tube m‴, surmounted by a tube n‴. (Shown also in Fig. 8.) This tube n‴ leads to the cap h″ of the reheater i″ j″, which is formed in one piece, and, as shown at the cut-away part o‴ o‴, is provided with tubes, through which the vapor passes into the lower chamber p‴. Up to about the middle of the reheater j″—that is to say, to the level of the line q‴ q‴—the apparatus is filled with an ammoniacal solution, and it then produces two effects under the influence of the steam produced by the waste heat. The first is the separation of the ammoniacal gas from its solution, and the second its separation from the water brought along and its superheating in the upper part of the apparatus i″ above the line q‴ q‴. Ammoniacal gas is thus formed, which passes off through the tube r‴. The superheating by water steam alone of the ammonia not being sufficiently intense to allow of profiting by all of its elastic and mechanical properties, I extend the pipe r‴ to the opening r‴, Fig. 2, of the coil. This coil is continuously submitted to the action of the heat of the gas-producer. It therefore allows the superheating of the ammonia, which leaves at the end $s^3$ and passes through the tube $s''''$ $s'''$ $s'''$. (Shown also in Fig. 6.) The tube $s'''$ connects the inlet-valves $h'$ $h'$ $g'$ $g'$ of the cylinder $t'$ $t'''$. The piston $u'''$ is connected by its rod $v'''$ with the cross-piece $c$, in which also engages the rod $d$ of the piston $e$. A firmness and regularity of movement is thus obtained throughout the whole apparatus. The ammoniacal vapors having performed their work pass off through the outlet-valves $k'$ $k'$ $j'$ $j'$ and then pass through the tube $w''''$ $w'''$. The water steam arrives at $p'''$, Fig. 8, in the bottom of the reheater $h''$ $i''$ $j''$. As a very important vaporization is produced in this reheater, since all the water steam is condensed and collected in the chamber $p'''$, the said water is drawn up through the medium of the tube $x^3$ through the valve $y^3$, which by means of the tube $z^3$ conducts the products of this condensation through the general feed-pipe $m''$ $m'''$ $m'''$, and there really remains in the chamber $p'''$ only air mixed with a little vapor, which must be constantly drawn off. For this purpose a pipe $a''''$ $a''''$ $a''''$ conducts this air saturated with vapor into the pneumatic pump $b''''$ $b''''$. This pump, which may be of any suitable construction, being constantly driven by the motor, keeps the apparatus empty. The steam which acts in the apparatus is completely condensed after the work, which causes an almost perfect vacuum to exist above the piston $e$, Fig. 6, while it is rising, and consequently the expanding gases which operate the piston act without back-pressure. As it is impossible to obtain a perfectly-tight piston, it is certain that a small quantity of explosive mixture will escape at each operation and will pass into the water steam employed. It is this mixture which is drawn in by the pneumatic pump $b''''$ $b''''$. It can be collected by placing a gasometer above the outlet-opening of the outlet-pipe of the pump $b''''$ $b''''$. The expelled gases thus accumulate in the cover of the said gasometer, and if this cover be placed in communication with the gas-pump $a$, Figs. 5 and 7, or with the air-pump $m$, Figs. 1, 7, and 8, it will be readily seen that the said gases are taken back into general circulation. The ammoniacal vapors, which have performed their work and are left in the tube $W'''$ $W''''$ $W'''$, Fig. 6, and which should be condensed, are brought into the apparatus shown in Fig. $10^{bis}$, in which a tube $W'''$ is shown leading to a distributer $c''''$ $c''''$, Figs. 10 and 11, which by means of the tubes $d''''$ $d''''$ $d''''$ $d''''$ $d''''$ conducts the ammoniacal vapors into an ammoniacal condenser $e''''''$ $e''''''$. This condenser contains an ammoniacal solution constantly cooled by a current of water, which enters through the tube $f''''$ and traverses all the tubes $g''''$ $g''''$ $g''''$ $g''''$ in the apparatus. These tubes all open into the cap or cover $h''''$, and the water thus introduced into the said cap or cover $h''''$ passes off through the tube $i''''$, carrying away all the caloric of condensation, which allows of the continuous absorption of the ammonia. In order that this absorption shall be continuous, a constant current of solution must be introduced into the apparatus and must be extracted after saturation. If this current be taken from the base of the reheater $i''$ $j''$, Fig. 8, through the tube $j''''$, it will be understood that this solution is hot and it is necessary that it should reach the absorber $e''''''$ $e''''''$ $e''''''$ $e''''''$ in a cool condition. On the other hand, it will be necessary in order to produce a constant current of ammoniacal vapors to feed the vaporizing-reheater $i''$ $j''$, Fig. 8. To obtain this double result I operate by way of exchange, as illustrated in Fig. 9. This figure shows the tube $j''''$ placed at the base of the reheater $i''$ $j''$, Fig. 8. The ammoniacal solution, leaving the said reheater, enters the upper part of the reheater $k^4$ and surrounds the tubes $b^5$ $b^5$ $b^5$ contained therein. The solution completely fills the reheater, and, passing off through a tube $l^4$, it enters a second reheater $m^4$. It then passes through the tube $n^4$ and fills the third reheater $o^4$, and finally leaves through the tube $p^4$. The filling of the reheaters is assisted by an air-tube $r^4$ $r^4$, provided with a blow-off cock $r^4$. The tube $p^4$ conducts the solution coming from the reheater $i''$ $j''$, Fig. 8, to the pump $s^4$ by the means hereinafter described. This pump is double-acting. The upper chamber (that is to say, that situated above the piston) is provided with a slide-valve, as shown in Fig. 9. It can then receive liquid under pressure and deliver it into an apparatus without pressure, which is what I require, because the solution leaving the reheater $i''$ $j''$, Fig. 8, under pressure passes to the absorber $e''''''$ $e''''''$, Fig. 10, which possesses a relative vacuum. On the other hand, the lower chamber of the pump $s^4$ is provided with a suction and force valve $t^4$. It is therefore able to draw in the solution contained in the condenser $e''''''$ $e''''''$, Fig. 10, and to force it into the reheater $i''$ $j''$, Fig. 8, where the ammonia is under pressure. The ammoniacal solution leaves the absorber $e''''''$ $e''''''$ through the tube $v''''$ $v''''$, Fig. 10, extending to the short tube $v^4$, Fig. 9, of the pump $s^4$. This pump, therefore draws in ammoniacal solution from the absorber $e''''''$ $e''''''$ $e''''''$, Fig. 10, and then forces it through the tube $w''''$ $w''''$ to the base of the reheater $o^4$. The solution rises through the tubes of the reheater up into the cap or cover $x^4$. Thence through a tube $y^4$ $y^4$ it returns to the base of the reheater $m^4$. It also travels through this reheater by rising in the interior of the tubes which it contains, reaches the cap or cover $z^4$, and passes off through the tube $a^5$. It then rises through the tubes $b^5$ $b^5$ $b^5$ into the cap or cover $c^5$, which it leaves through the tube $d^5$, which conducts the reconstituted solution into the reheater $i''$ $j''$, Fig. 8. It will be now readily understood that this solution arrives there in a hot state, since it has been caused to circulate in the tubes of the reheaters $o^4\ m^4\ k^4$, which are surrounded by the solution leaving the reheater $i''\ j''$, Fig. 8, in a hot state, and consequently the latter becomes cooled. I could introduce this solution into the absorber $e''''\ e''''$ directly it egresses from the pump $s^4$, Fig. 9; but, as it is important to cool it as completely as possible, I cause it as it leaves the pump $s^4$ to pass through the tube $e''''$, Fig. 9, (see also Fig. 10,) attached to the cap or cover $f'''''$ of the reheater $g'''''\ g'''''$. The tubes $h'''''$ contained in this reheater are surrounded by a current of cold water, which enters through $i'''''$ and leaves through $j'''''$. The solution is then completely cool when it arrives in the cap or cover $K'''''$, whence it leaves through the tube $l'''''\ l'''''$, and is distributed by means of a rose-head $m'''''$ onto carbon or coke contained in a chamber $n'''''$. This arrangement has for object to absorb the ammoniacal vapors which would have escaped during the absorption, and which are brought into the chambers $n'''''$ through the tube $o'''''$. The openings $p'''''\ p'''''$ allow the entry of the solution into the absorber $e''''''\ e''''''$.

The chamber $q'''''$ is a washer containing water, in which air is forced from a cock $t'''''$ by means of a vacuum-pump $b''''\ b''''$, Fig. 8.

The pump $u$, Fig. 9, is a water-pump, serving any required purpose for use in the apparatus.

The cycle of operations above described of the ammonia completes the triple-motive action which I have produced by means of the heat from the gas-producer, and it is by these combined means that I am enabled to produce motive power under conditions of economy not hitherto discovered.

Having now described the nature of my said invention and the manner of performing the same, I declare that what I claim is—

1. In a motor apparatus in which combustible gases water steam under pressure, and ammoniacal gas are simultaneously employed, the combination of a gas-producing apparatus K, a reheater B', suction and force pumps $a$ and $m$, and a motor-piston $e$, the whole being arranged and operating as hereinbefore described.

2. In a motor apparatus in which combustible gases, water steam under pressure, and ammoniacal gas are simultaneously employed, the combination, with the apparatus K, for producing combustible gases, of an exterior boiler A B, the motor-piston $e$, and the superheater B''' C''' A''', the whole being arranged and operating as hereinbefore described.

3. In a motor apparatus in which combustible gases, water steam under pressure, and ammoniacal gas are simultaneously employed, the combination of an ammonia-vaporizer $i''\ j''$, a motor-piston $u'''$, connected with the piston $e$, the coil W, placed in the apparatus for producing combustible gases, and reheaters and condensers $e''''''\ k^4\ m^4\ o^4$, the whole being arranged and operating as hereinbefore described.

4. In a motor apparatus in which combustible gases, water steam under pressure, and ammoniacal gas are simultaneously employed, the exterior boiler A B, in combination with the heating apparatus K, as hereinbefore described, and illustrated in the accompanying drawings.

5. In a motor apparatus in which combustible gases, water steam under pressure, and ammoniacal gas are simultaneously employed, the water-reheater B', having the inclosed series of tubes A' therein, as hereinbefore described.

6. In a motor apparatus in which combustible gases, water steam under pressure, and ammoniacal gas are simultaneously employed, the combination of the apparatus K, for producing combustible gases, with the lateral water-circulating tubes R, as hereinbefore described.

7. In a motor apparatus in which combustible gases, water steam under pressure, and ammoniacal gas are simultaneously employed, the combination of the apparatus K, for producing combustible gases, with its draft-flue U' and the valve V', as hereinbefore described, and illustrated in the accompanying drawings.

8. In a motor apparatus in which combustible gases, water steam under pressure, and ammoniacal gas are simultaneously employed, the injectors Q and their reheating-coil O', in combination with the gas-producing apparatus K, as hereinbefore described.

9. In a motor apparatus in which combustible gases, water steam under pressure, and ammoniacal gas are simultaneously employed, the reheater B''', the boiler C''', and the superheater A''', in combination with the motor-cylinder $A^3$, furnishing the hot gases, as and for the purpose hereinbefore described.

10. In a motor apparatus in which combustible gases water, steam under pressure, and ammoniacal gas are simultaneously employed, the combination of the superheating-vaporizer $i''\ j''$ and the coil W of the apparatus K, the whole being constructed and operating as hereinbefore described.

11. In a motor apparatus in which combustible gases, water steam under pressure, and ammoniacal gas are simultaneously employed, the combination of the motor-cylinder $A^3$ and the pneumatic pump $b''''\ b''''$, as and for the purpose hereinbefore described.

12. In a motor apparatus in which combustible gases, water steam under pressure, and ammoniacal gas are simultaneously employed, the apparatus $r''\ o''\ q''$, for regulating the water-feed, substantially as set forth.

CHARLES TELLIER.

Witnesses:
B. DELATHE, Fils,
M. DUFRERY.